United States Patent
Suzuki (10) Patent No.: US 9,434,234 B2
(45) Date of Patent: Sep. 6, 2016

(54) AIR PASSAGE OPENING/CLOSING DEVICE

(75) Inventor: Yoshihiro Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1275 days.

(21) Appl. No.: 13/348,933

(22) Filed: Jan. 12, 2012

(65) Prior Publication Data

US 2012/0180393 A1 Jul. 19, 2012

(30) Foreign Application Priority Data

Jan. 14, 2011 (JP) .................. 2011-005964

(51) Int. Cl.
*B24D 13/00* (2006.01)
*B60H 1/00* (2006.01)

(52) U.S. Cl.
CPC .. B60H 1/00692 (2013.01); B60H 2001/00714 (2013.01)

(58) Field of Classification Search
USPC .......................................... 454/69
IPC .............................. B60H 1/00692,2001/0071
See application file for complete search history.

(56) References Cited

U.S. PATENT DOCUMENTS

| | | | |
|---|---|---|---|
| 7,794,314 B2 * | 9/2010 | Sekiya | ............... B60H 1/00692 165/41 |
| 2009/0023374 A1 | 1/2009 | Suzuki et al. | |
| 2009/0313899 A1 | 12/2009 | Tokunaga et al. | |

FOREIGN PATENT DOCUMENTS

| | | |
|---|---|---|
| CN | 101348066 | 1/2009 |
| CN | 101607517 | 12/2009 |
| JP | 2003-104032 | 4/2003 |
| JP | 2009-040390 | 2/2009 |

OTHER PUBLICATIONS

Office action dated Jan. 2, 2014 in corresponding Chinese Application No. 201210008789.6.
Office action dated Jan. 21, 2014 in corresponding Japanese Application No. 2011-005964.

* cited by examiner

*Primary Examiner* — Helena Kosanovic
(74) *Attorney, Agent, or Firm* — Harness, Dickey & Pierce, P.L.C.

(57) ABSTRACT

A case of an air passage opening/closing device is formed with guide grooves comprised of case side seal surfaces and a guide wall surface, two ends of a door body part are arranged inside the guide grooves, a gear mechanism has a driven side gear which is provided at the door body part and a drive side gear which engages with the driven side gear, the driven side gear is formed to extend in parallel with a movement direction of a slide door at a portion of the door body part which is positioned further inside in the width direction from the guide grooves, and a portion of the door body part facing the guide wall surface or a portion of the guide wall surface facing the door body part is formed with interposed parts which are interposed between the door body part and the guide wall surface.

10 Claims, 8 Drawing Sheets

RELATED ART

FIG.10A

RELATED ART

FIG.10B

RELATED ART

FIG.10C

RELATED ART

FIG.10D

AIR PASSAGE OPENING/CLOSING DEVICE

BACKGROUND OF THE INVENTION

1. Field of the Invention

The present invention relates to an air passage opening/closing device which uses a slide door to open and close an air passage.

2. Description of the Related Art

In the past, a vehicular air-conditioning system using such an air passage device has been disclosed in Japanese Patent Publication (A) No. 2009-40390. In this related art, a slide door having a plate-shaped door body part is made to slide to open and close an air passage formed in a plastic case.

In this related art, racks (driven side gears) are arranged on the upwind side plate surface of the door body part. Each rack is engaged with a pinion (drive side gear) so as to drive the slide door. The rack (driven side gear) is formed at the upwind side plate surface of the door body part at each end in the door width direction so as to project out to the upwind side and extend in the door movement direction.

Further, in this related art, guide grooves are formed for guiding the slide movement of the slide door. Inside of the guide grooves, the two ends of door body part in the door width direction are arranged, whereby the slide movement of the slide door is guided.

Each of the guide grooves is comprised of a case side seal surface which faces the plate surface of the door body part and a guide wall surface. When the slide door closes the air passage, the air pressure is utilized to make the plate surface of the door body part abut against the case side seal surface and thereby give rise to a sealing ability.

Note that, in this related art, the racks (driven side gears) are formed at the two ends of the door body part in the door width direction, so the racks (driven side gears) are also arranged inside of the guide grooves. In this related art, the guide grooves are formed integrally with the case.

SUMMARY OF THE INVENTION

Figure 10A:
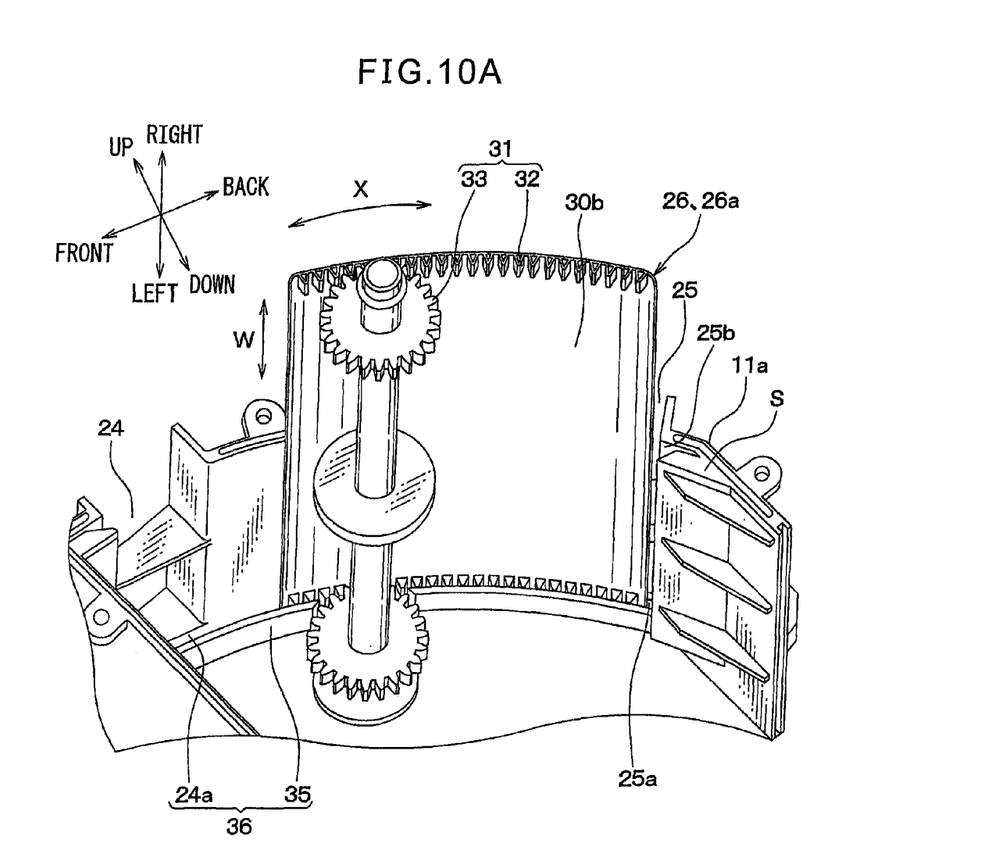
FIG. 10A is a perspective view showing the related art.
Figure 10B:
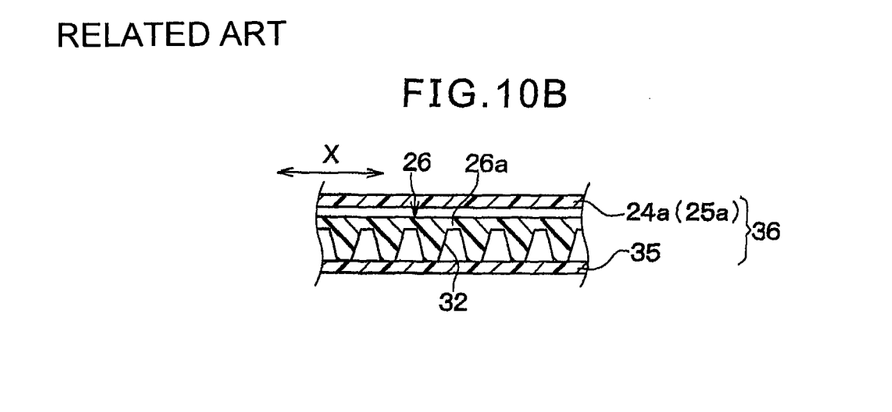
FIG. 10B is a cross-sectional view showing the related art.

FIGS. 10A and 10B are a perspective view and cross-sectional view, showing the above related art. According to detailed studies by the inventors, in the above related art, racks 32 (driven side gears) are arranged at the inside of the guide grooves 36, so if making the slide door 26 slide, the racks 32 and guide wall surfaces 35 slide against each other. If the racks 32 are arranged inside of the guide grooves 36 in this way, it is learned that the teeth of the rack 32 which engage with the pinion 33 (drive side gear) or the surface of the guide wall surface 35 become rough and have an effect on sliding.

Figure 10C:
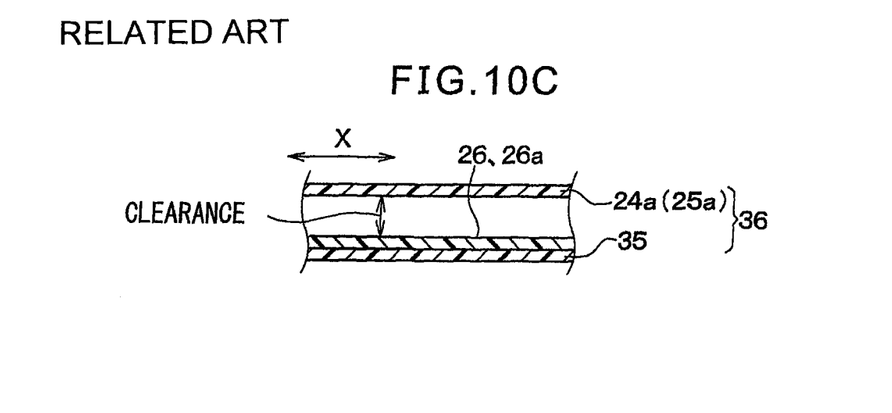
FIG. 10C is a cross-sectional view showing a case study.

In the case study shown in FIG. 10C, in view of the above points, the racks 32 are arranged at a position outside from the guide grooves 36 (inside of door width direction). In this case study, the clearance between the case side seal surfaces 24a and 25b and the door body part 26a becomes larger, so the sealing ability becomes poor, so this is not preferable.

Figure 10D:
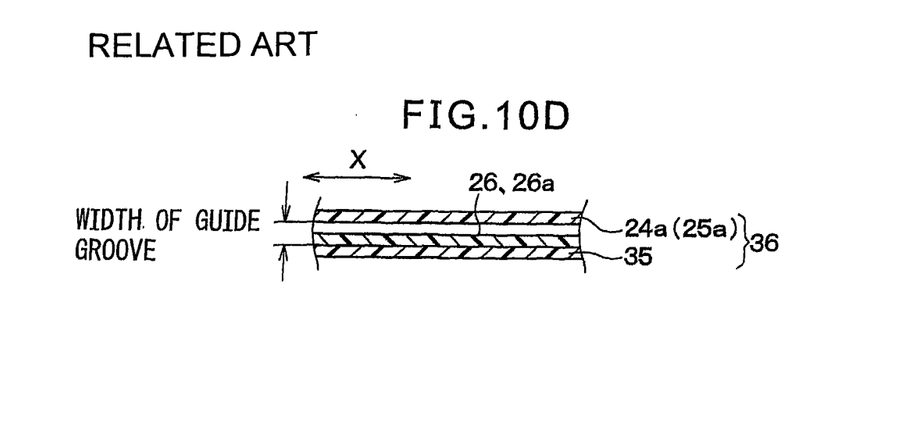
FIG. 10D is a cross-sectional view a case study.

In the case study shown in FIG. 10D, the clearance in the case study of FIG. 10C is filled in to make the width of the guide groove 36 narrower. In this case study, a thin type of guide groove 36 is formed, so the strength of the mold becomes insufficient, so this is not preferred.

The present invention was made in consideration of the above point and has as its object to suppress deterioration of the sealing ability and secure the width of the guide groove even when arranging the driven side gear at a position outside from the guide grooves.

To achieve the above object, one aspect according to the present invention is an air passage opening/closing device comprising:

a case (11) which forms an air passage (17, 19);

a slide door (26) which has a door body part (30) made of plastic formed in a plate shape, which is arranged to be able to slide in the case (11), and which opens and closes the air passage (17, 19); and a gear mechanism (31) which drives the slide door (26), wherein the case (11) is formed with guide grooves (36) which are positioned at two sides of the air passage (17, 19) in the width direction (W) of the door body part (30) and each of which is comprised of a case side seal surface (17a, 19a) which the door body part (30) abuts against and a guide wall surface (35) which faces the case side seal surface (17a, 19a), the two end parts of the door body part (30) in the width direction (W) are arranged inside of the guide grooves (36), the gear mechanism (31) has at least one driven side gear (32) which is provided at the door body part (30) and at least one drive-side gear (33) which engages with the driven side gear (32), the driven side gear (32) is formed to extend in parallel with a movement direction (X) of the slide door (26) at a portion positioned at the inside in the width direction (W) from the guide grooves (30) at the door body part (30), and a portion of the door body part (30) facing the guide wall surface (35) or a portion of the guide wall surface (35) facing the door body part (30) is formed with interposed parts (40, 41) which are interposed between the door body part (30) and the guide wall surface (35).

According to this, there are interposed parts (40, 41) present between the door body part (30) and the guide wall surface (35), so even if arranging the driven side gear (32) at a position outside from the guide grooves (36), the clearance between the case side seal surface (17a, 19a) and the door body part (30) becomes larger, the sealing ability can be kept from deteriorating, and the width of the guide groove (36) can be secured.

In the present invention, the interposed parts (40 and 41) may comprise a plurality of projections which are arranged in the movement direction (X) of the slide door (26). Further, the distance between the plurality of projections may be larger than the distance between teeth of the driven side gear (32).

According to this, it is possible to absorb the vibration of projections by the portions between projections in the door body part (30), so it is possible to suppress the sliding noise of the projections.

In the present invention, when the module value of the driven side gear (32) is "m", the plurality of projections are preferably formed at intervals of $2 \times m \times \pi$ or more.

In the present invention, the interposed parts (40, 41) preferably have a bending rigidity in the movement direction (X) of the slide door (26) higher than the teeth of the driven side gear (32).

According to this, it is possible to suppress the bending deformation and vibration of the interposed parts (40, 41), so it is possible to suppress the sliding noise of the interposed parts (40, 41).

In the present invention, the interposed parts (40, 41) preferably have projecting shapes with a base length dimension (L1) larger than a height dimension (H1).

In the present invention, the interposed parts (40, 41) preferably have projecting shapes with a base length dimension (L1) larger than a front end length dimension (L2).

In the present invention, the interposed parts (40) are formed integrally at the door body part (30).

In the present invention, the interposed parts (41) may also be formed integrally with the guide wall surface (35).

According to this, management of the clearance between the case side seal surface (19a, 17a) and the guide wall surface (35) as a whole is unnecessary. Management of the clearance between only the interposed parts (40, 41) and the case side seal surface (19a, 17a) is enough, so formation can be simplified.

In the present invention, the interposed parts (40) may be formed with hollow relief spaces (40a).

Due to this, when forming the interposed parts (40), it is possible to suppress the formation of so-called "sink marks".

In the present invention, the relief spaces (40a) may open toward the width direction (W).

In the present invention, the relief spaces (40a) may open facing a direction parallel to the projecting direction of the projecting parts (40).

Note that the reference signs in parentheses after the means described in this section and the claims show the correspondence with specific means described in the embodiments explained later.

The present invention may be more fully understood from the description of preferred embodiments of the invention, as set forth below, together with the accompanying drawings.

DESCRIPTION OF THE PREFERRED EMBODIMENTS

First Embodiment

Figure 1:
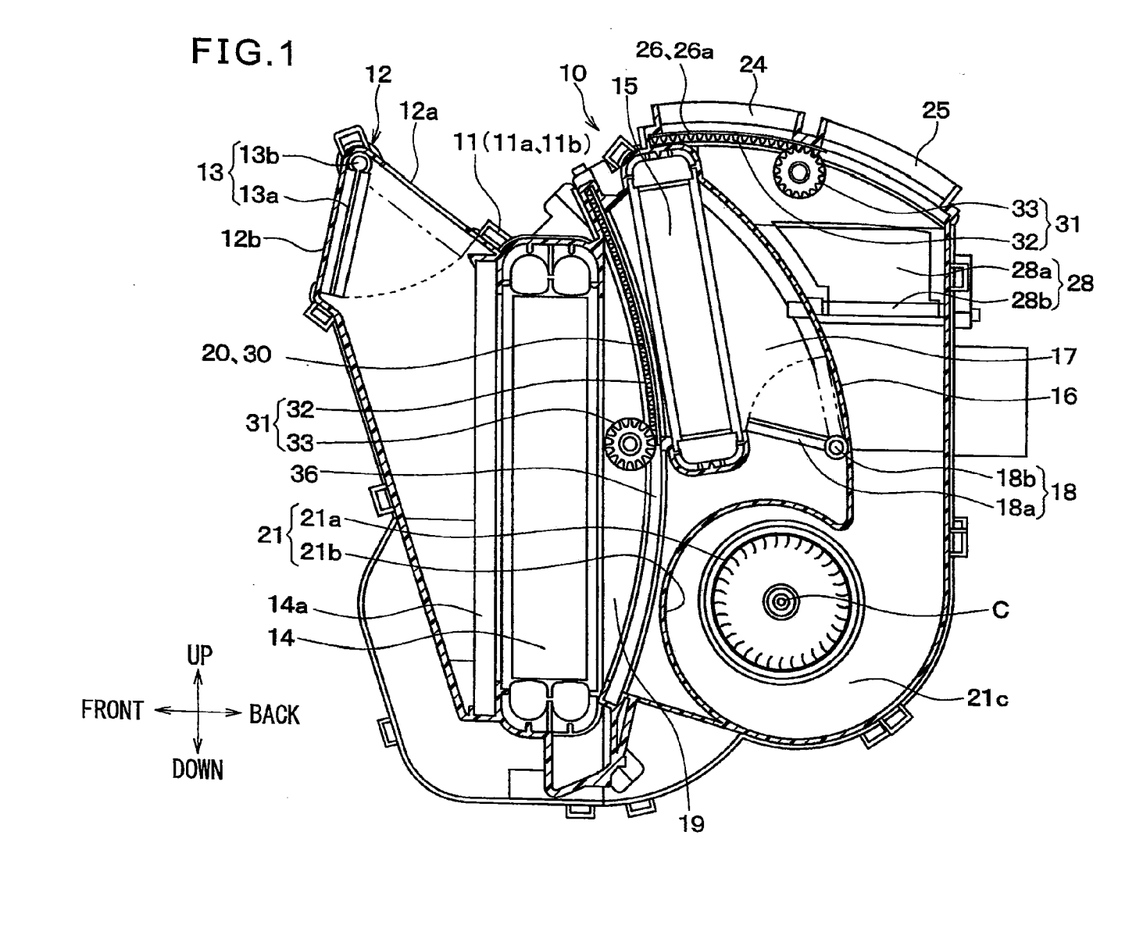
FIG. 1 is a cross-sectional view of an inside air-conditioning unit of a vehicular air-conditioning system in a first embodiment.

Below, a first embodiment will be explained based on FIG. 1 to FIG. 6B. FIG. 1 is a cross-sectional view of an inside air-conditioning unit 10 of a vehicular air-conditioning system of the present embodiment. Note that the "front", "back", "up", and "down" arrows in FIG. 1 indicate the direction in the state with the inside air-conditioning unit 10 mounted in an automobile.

The inside air-conditioning unit 10 is arranged at the approximate center part of the vehicle width direction (left-right direction) at the inside of the instrument panel at the frontmost part inside of the vehicle. The inside air-conditioning unit 10 has a case 11 which forms the outer housing and which forms an air passage for the inside blown air which is blown toward the inside of the passenger compartment. This case 11 is molded from a plastic which has a certain extent of flexibility and is excellent strength wise as well (for example, polypropylene).

The case 11 has a split line S at the approximate center part in the vehicle width direction (see later FIG. 4). At this split line S, it can be split into two left and right split parts 11a, 11b. These two left and right split parts 11a, 11b are connected together by metal springs, clips, screws, and other fastening means in the state housing inside them a later explained evaporator 14, heater core 15, and other component devices.

As shown in FIG. 1, at the vehicle front side and top side of the case 11, the upstream-most part of the air passage formed in the case 11 is provided with an inside/outside air switching part 12 which switches and introduces inside air (air inside compartment) and outside air (air outside compartment). This inside/outside air switching part 12 is formed with an inside air introduction port 12a which introduces inside air into the case 11 and an outside air introduction port 12b which introduces outside air.

Inside of the inside/outside air switching part 12, an inside/outside air switching door 13 which opens and closes an inside air introduction port 12a and outside air introduction port 12b is arranged in a freely pivotable manner. Specifically, this inside/outside air switching door 13 is a so-called cantilever door comprised of a plate-shaped door body part 13a integrally joined at one end side to a shaft part 13b which extends in the vehicle width direction.

At the inside/outside air switching part 12, a not shown servo motor is used or the part is manually operated to make the shaft part 13b rotate and make the door body part 13a turn and displace, to enable continuous adjustment of the area of the inside air introduction port 12a and the outside air introduction port 12b.

At the downstream side in the flow of air of the inside/outside air switching part 12, an evaporator 14 is arranged in the substantially top-down direction (substantially vertical direction). The evaporator 14 is one of the devices forming a known evaporation-compression type refrigeration cycle system (not shown). It is a cooling use heat exchanger which causes the low pressure coolant inside of the refrigeration cycle system to evaporate to exert an endothermic action and thereby cool the air blown into the passenger compartment.

At the upstream side in the flow of air of the evaporator 14, a filter 14a is provided so as to cover the entire surface of the heat exchanging surface (core surface) of the evaporator 14. This filter 14a traps the dust etc. in the inside air and outside air which flows from the inside/outside air switching part 12 to the inside of the case 11.

At the vehicle back side and top side of the downstream side in the flow of air in the evaporator 14, a heater core 15 is arranged. The heater core 15 is a heating use heat exchanger which makes high temperature engine cooling water which circulates through a not shown engine cooling water circuit flow inside of it, exchanges heat between the engine cooling water and the cool air which was cooled by the cooling evaporator 14, and thereby reheats the cool air.

This heater core 15 is also arranged in the substantially top-bottom direction, but is arranged so that the bottom side slants somewhat to the vehicle rear direction compared with the top side. Due to this, the operating space of the air mix door 20 explained later is secured. Note that, if the evaporator 14 and heater core 15 are arranged in the substantially top-down direction, it means that the heat exchange surface (core surface) is arranged to extend in the substantially top-down direction.

At the rear and top side of the evaporator 14, an air passage of the heater core 15, that is, the warm air passage 17, is formed. At the vehicle rear side of the heater core 15, a wall part 16 which forms part of the inside wall surface of the warm air passage 17 is integrally formed with the case 11.

This wall part 16 extends bent in an arc in the vehicle up-down direction. Due to this, at the vehicle rear side of the heater core 15, the warm air passage 17 is formed to extend from the top toward the bottom. Warm air which is heated by the heater core 15 flows from the top toward the bottom.

At the downstream-most part of the warm air passage 17, a warm air guide member 18 which guides the flow of warm air is arranged. This warm air guide member 18 is configured as a cantilever door structure similar to the inside/outside air switching door 13.

Therefore, by a not shown servo motor or manual operation, it is possible to make the shaft part 18b which extends in the vehicle width direction rotate and make the plate-shaped body 18a which is connected to the shaft part 18b rotate and displace to enable change of the direction of flow of the warm air.

At the rear side of the evaporator 14 and the bottom side of the heater core 15, a cool air passage 19 is formed. This cool air passage 19 is a bypass passage through which cool air after passing through the evaporator 14 flows bypassing the heater core 15.

Right after the evaporator 14, an air mix door 20 which adjusts the ratio of the flow rate of cool air which is made to flow to the warm air passage 17 side and the flow rate of cool air which is made to flow to the cool air passage 19 is arranged. This air mix door 20 corresponds to the slide door in the present invention and has a door body part 30 which is formed to a plate shape by plastic. This door body part 30 is configured to be driven to displace, through a gear mechanism 31, by a not shown servo motor or manual operation, in the bending direction of the door body part 30.

More specifically, by making the door body part 30 of the air mix door 20 move (slide) upward in the vehicle, the passage opening degree of the cool air passage 19 side is increased and the passage opening degree of the warm air passage 17 is decreased. Conversely, by making the door body part 30 move (slide) downward in the vehicle, the passage opening degree of the cool air passage 19 side is decreased and the passage opening degree of the warm air passage 17 is increased.

Further, by adjustment of the opening degree of this air mix door 20, the ratio of the flow rates of cool air and warm air taken into the blower 21 is adjusted and the temperature of the air blown into the passenger compartment which is blown in from the blower 21 toward the passenger compartment is adjusted. In other words, the air mix door 20 forms a temperature adjusting means for the air blown into the passenger compartment.

The blower 21 which blows air toward the passenger compartment is arranged at the downstream side in the flow of air of the evaporator 14 and heater core 15, more specifically, at the downstream side of the warm air passage 17 (lower side of vehicle) and the downstream side of the cool air passage 19 (rear side of vehicle).

The blower 21 has a known centrifugal multibladed fan 21a which has a plurality of blades which are arranged at predetermined intervals in a ring around a shaft C extending in the vehicle width direction and a scroll casing 21b which houses this centrifugal multibladed fan 21a and forms an outflow passage 21c through which the air flowing out from this centrifugal multibladed fan 21a passes.

The scroll casing 21b is a scroll-shaped fan casing with a passage cross-sectional area of the outflow passage 21c which gradually expands toward the direction of rotation of the centrifugal multibladed fan 21a and is formed integrally with the case 11. An opening is provided at the portion of the centrifugal multibladed fan 21a corresponding to the air intake port. Therefore, air is sucked in through this opening to the air intake port of the centrifugal multibladed fan 21a.

Note that, the centrifugal multibladed fan 21a blows air by rotational drive power from a not shown electric motor.

At the top surface of the case 11, at the approximate center part in the vehicle front-rear direction, a defroster opening 24 is provided with vents air sent from the blower 21 toward the front windshield of the vehicle.

The air which passes through this defroster opening 24 is vented, through a not shown defroster duct and defroster vents provided at the top surface of the vehicle instrument panel, toward the inside surface of the vehicle front window glass.

At the top surface of the case 11 and rear of the defroster opening 24, a face opening 25 which vents air which is blown from the blower 21 toward the face side of the passengers in the passenger compartment is provided. Specifically, the air which passes through this face opening 25 is blown out toward the passengers inside the passenger compartment through a not shown face duct and face vents provided at the front of the vehicle instrument panel.

Directly below the defroster opening 24 and face opening 25, a defroster/face door (vent mode switching door) 26 is arranged for adjusting the flow rates of the air-conditioned air which passes through the defroster opening 24 and the air-conditioned air which passes through the face opening 25.

The defroster/face door 26 has a plate-shaped door body part 26a. This door body part 26a is configured so as to be driven to be displaced, through a gear mechanism 31, by a not shown servo motor or by manual operation, in the bending direction of the door body part 30.

More specifically, by making the door body part 26a of the defroster/face door 26 move to the rear of the vehicle, the opening degree of the defroster opening 24 is increased. Conversely, by making the door body part 26a move to the front of the vehicle, the opening degree of the face opening 25 is increased.

At the top part of the case 11 at the two side surfaces of the vehicle width direction, foot openings 27 which vent air which was blown from the blower 21 toward the foot sides of the passengers in the passenger compartment are provided. Specifically, the air which passes through the foot openings 27 is vented toward the foot sides of the passengers in the passenger compartment through a not shown foot duct and foot vents which are provided near the feet of the passengers in the passenger compartment.

Further, at each foot opening 27, the foot door (vent mode switching door) 28 which opens and closes the foot opening 27 is arranged. This foot door 28 is a plate-shaped door body part 28a at the approximate center part of which a shaft part 28b extending in the vehicle front-rear direction is integrally connected, that is, a so-called butterfly door. Further, a not shown servo motor or manual operation is used to make the shaft part 28b rotate and make the door body part 28a rotate and displace to thereby open or close the foot opening 27.

Figure 2:
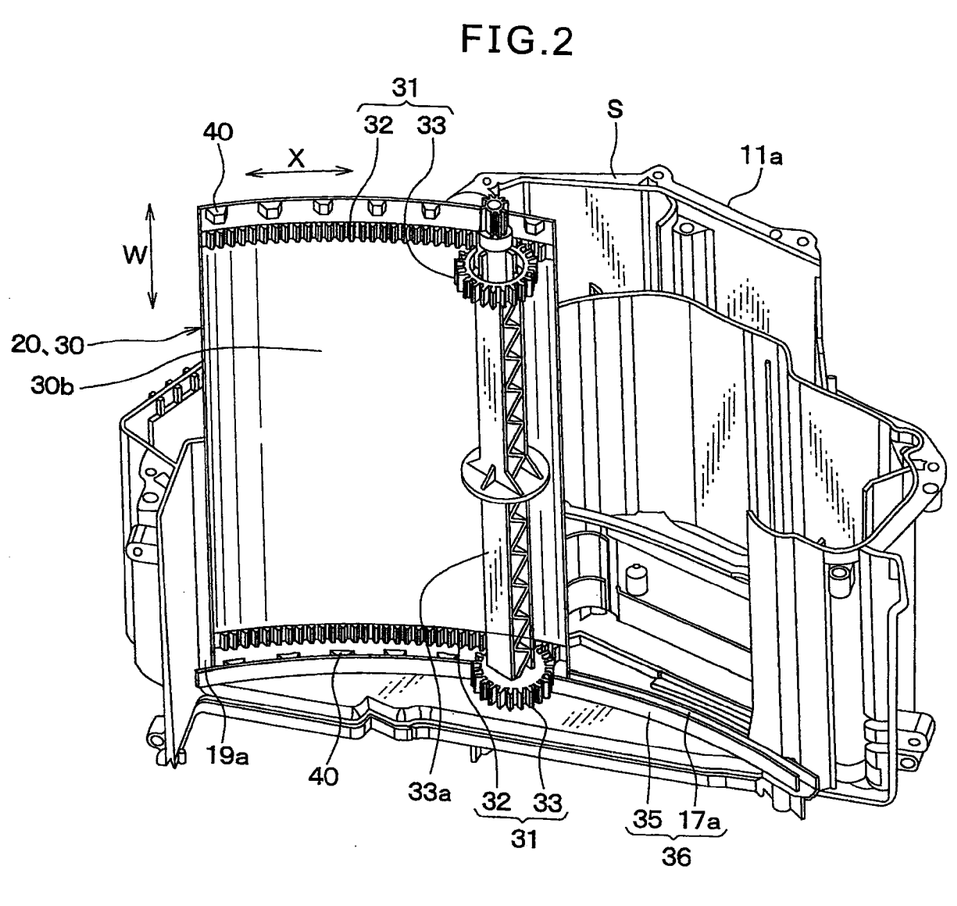
FIG. 2 is a perspective view of key parts of an inside air-conditioning unit in the first embodiment.

FIG. 2 is a perspective view of key parts of the inside air-conditioning unit 10 showing details of the configuration of the air mix door 20.

In FIG. 2, the arrow W indicates the width direction of the door body part 30 of the air mix door 20 (below, called the "door width direction W"), while the arrow X indicates the movement direction of the air mix door 20 (below, called the "door movement direction X"). Due to limitations in illustration, in FIG. 2, only one split part 11a in the two left and right split parts 11a and 11b forming the case 11 is illustrated.

In this example, the door width direction W is made to match the vehicle width direction and the door movement direction X is made substantially parallel with the vehicle top-bottom direction.

At the peripheral edge of the cool air passage 19, a case side seal surface 19a is formed. If the air mix door 20 closes the cool air passage 19 and the door body part 30 receives air pressure, the plate surface 30a of the downwind side (top side of FIG. 2) of the door body part 30 abuts against the case side seal surface 19a to give rise to the sealing ability.

At the peripheral edge of the warm air passage 17, a case side seal surface 17a is formed. When the air mix door 20 closes the warm air passage 17 and the door body part 30 receives air pressure, the downwind side plate surface 30a of the door body part 30 abuts against the case side seal surface 17a to give rise to a sealing ability.

Note that, it is also possible to attach a seal member made of polyurethane foam etc. to the downwind side plate surface 30a and make the downwind side plate surface 30a abut against the case side seal surfaces 17a, 19a through this seal member.

At the side surface wall part of the case 11, a guide wall surface 35 which extends in the door movement direction X and which faces the case side seal surfaces 17a, 19a is formed. The case side seal surfaces 17a, 19a and guide wall surface 35 have shapes bent in arcs when viewed from the door width direction W. The dimension of the distance between the case side seal surface 17a or 19a and guide wall surface 35 is constant.

Between the case side seal surfaces 17a, 19a and guide wall surface 35, the two ends of the door body part 30 in the door width direction W are inserted. The door body part 30, in its solitary state, is a flat shape, so in the state with its two ends inserted between the case side seal surfaces 17a, 19a and guide wall surface 35, bends and deforms along the bent shape of the case side seal surfaces 17a, 19a and guide wall surface 35.

The case side seal surfaces 17a, 19a and guide wall surface 35 form guide grooves 36 which guide slide movement of the door body part 30.

The gear mechanism 31 which drives the door body part 30 has plastic driven side gears 32 (racks) which are formed integrally with the door body part 30 and circular drive side gears 33 (pinions) which engage with the driven side gears 32.

The driven side gear 32 is a rack which extends in parallel to the door movement direction X and sticks out from the upwind side (lower side of FIG. 2) of the plate surface 30b of the door body part 30 toward the upwind side. the driven side gears 32 are formed at the portions of the door body part 30 which are positioned outside of the guide grooves 36 (portions at inside from two ends in door width direction W).

The drive side gears 33 are connected with a drive shaft 33a which extends in the door width direction W. The two ends of the drive shaft 33a are rotatably supported at bearing holes (not shown) at the side surface wall part of the case 11. One end of the drive shaft 33a is connected to a not shown door drive device (servo motor etc.) In the present example, the drive side gears 33 and the drive shaft 33a are integrally formed by plastic.

Figure 3:
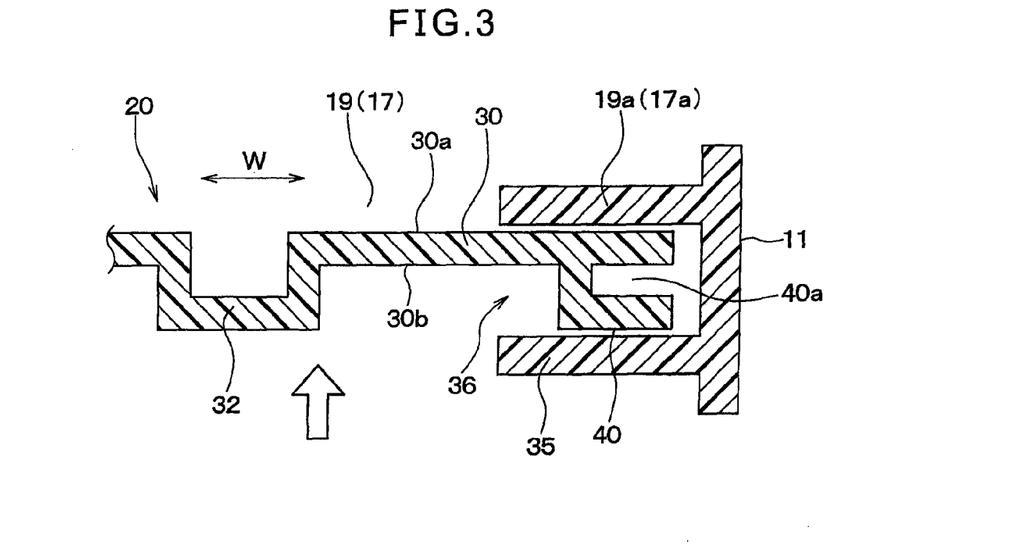
FIG. 3 is a cross-sectional view of key parts of an inside air-conditioning unit in the first embodiment.
Figure 4:
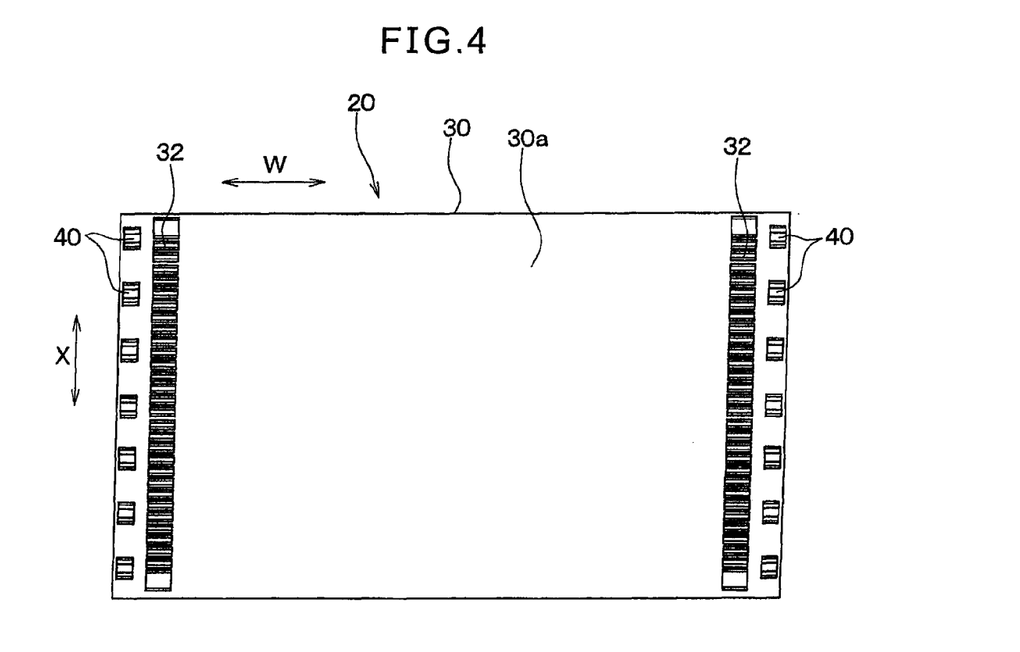
FIG. 4 is a plan view of a door body part and driven side gear in the first embodiment.
Figure 5A:
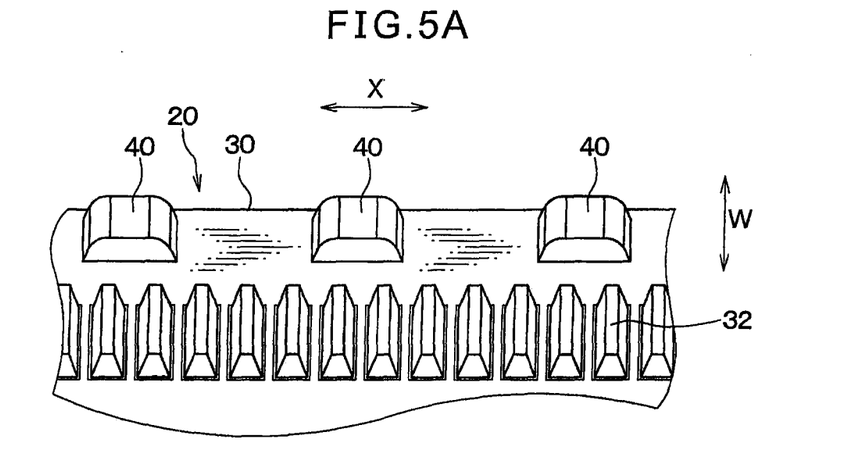
FIGS. 5A and 5B are perspective views of a door body part and driven side gear in the first embodiment.
Figure 5B:
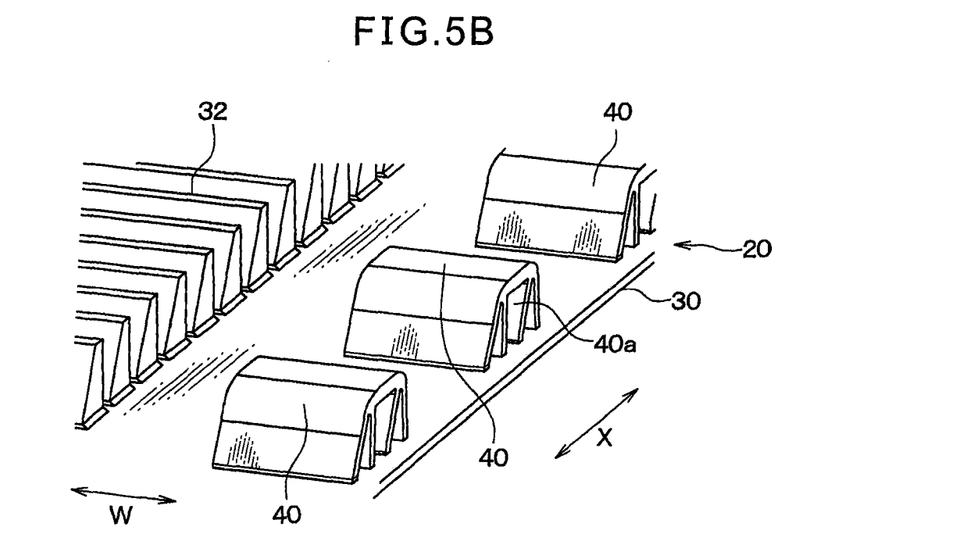

FIG. 3 is a cross-sectional view of one end of the door body part 30, one of the driven side gears 32, and one of the guide grooves 36, FIG. 4 is a plan view of the door body part 30 and driven side gears 32, and FIGS. 5A and 5B are perspective views of the door body part 30 and driven side gear 32.

FIG. 3 shows a cross-section in a cool air passage 19, but the cross-section of the warm air passage 17 is similar to FIG. 3. Therefore, in parentheses in FIG. 3, corresponding reference signs are assigned to the cross-section at the warm air passage 17. Illustration of the cross-section of the warm air passage 17 is omitted.

At the portion of the door body part 30 positioned at the inside of the guide grooves 36 (two ends in door width direction W), a plurality of projections 40 which stick out toward the guide wall surface 35 side (lower side in FIG. 3) are integrally formed.

The plurality of projections 40 are formed in parallel with the door movement direction X and are interposed between the door body part 30 and the guide wall surface 35. Therefore, the plurality of projections 40 can be expressed as interposed parts.

The plurality of projections 40 are arranged with distances between them. Due to this, bending deformation of the door body part 30 is not obstructed by the projections 40.

Figure 6A:
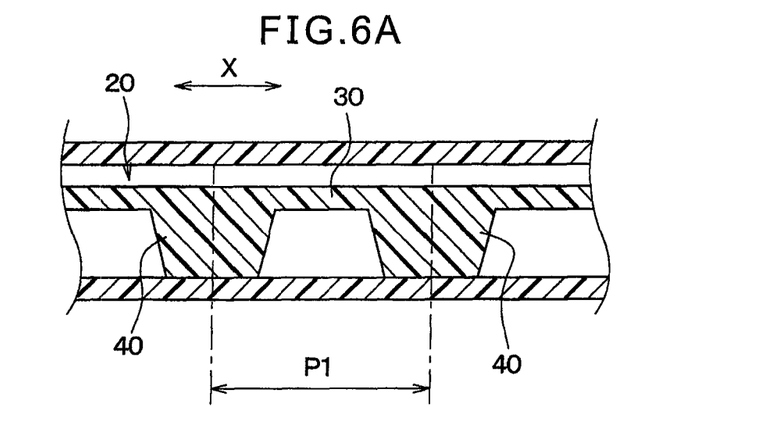
FIGS. 6A and 6B are cross-sectional views of projection parts in the first embodiment.
Figure 6B:
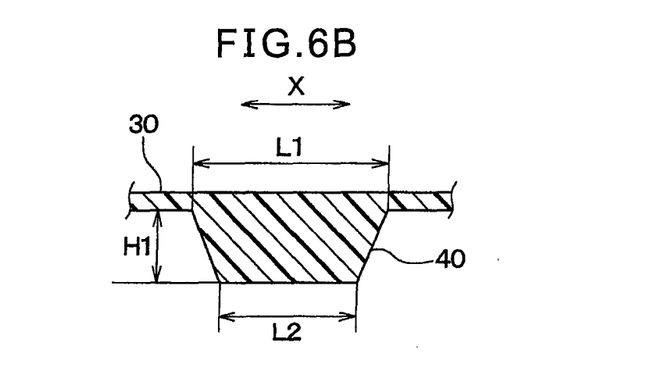

FIGS. 6A and 6B are cross-sectional views of the projections 40. The distance between the projections 40 is greater than the distance between teeth of the driven side gear 32. Specifically, the pitch dimension P1 between projections 40 is $2 \times m \times \pi$ or more. "m" is the module value of the driven side gear 32. That is, the pitch dimension P1 is 2 times or more the pitch dimension of the driven side gear 32.

The projections 40 have a higher bending rigidity of the door movement direction X compared with the teeth of the driven side gear 32. Specifically, the projections 40 have a shape with a base length dimension L1 larger than the front end length dimension L2 and height dimension H1.

As shown in FIG. 3 and FIG. 5B, the projections 40 are formed will hollow relief spaces 40a. The relief spaces 40a open toward the door width direction W.

In the present example, the relief spaces 40a are made to open in the door width direction W from the center side of the door body part 30 (left side of FIG. 3) toward the outside (right side of FIG. 3). In other words, the relief spaces 40a are formed by lateral removal of material from the outside.

Note that the defroster/face door 26 is similar in basic configuration to the above-mentioned air mix door 20, so explanation of the details of the configuration of the defroster/face door 26 will be omitted.

Next, the electrical control part of the present embodiment will be briefly explained. The servo motors for the above-mentioned air mix door 20, defroster/face door 26, and foot door 28 and the electric motor 23 for the blower 21 and other various actuators are connected to the output side of a not shown air-conditioning control device. Their operations are controlled by control signals which are output from the air-conditioning control device.

The air-conditioning control device is comprised of a known microcomputer including a CPU, ROM, RAM, etc. and its peripheral circuits. This air-conditioning control device stores a program for control of the air-conditioning system in the ROM and uses this program for control of the air-conditioning system as the basis for performing various calculations and processing so as to control the operation of the air-conditioning control device which is connected to the output side.

At the input side of the air-conditioning control device, a group of sensors for detecting the outside air temperature Tam, inside air temperature Tr, sunlight Ts striking the inside of the passenger compartment, and other vehicle environment conditions and an operating panel which is provided with operating switches for outputting operational control signals of the vehicle air-conditioning system, a temperature setting switch for setting the vehicle compartment target temperature Tset, etc. are connected.

Next, the operation of the present embodiment in the above constitution will be explained. In the vehicle operating state, if the operating switch is turned on, the air-conditioning control device runs the program for control of the air-conditioning system which is stored in the ROM. If the program for control of the air-conditioning system is run, the detection signals which were detected by the above-mentioned group of sensors and the operating signals from the operating panel are read. Then, based on these signals, the target vent temperature TAO of the air blown into the passenger compartment is calculated.

Further, the air-conditioning control device uses the target vent temperature TAO etc. as the basis to determine the speed (blowing rate) of the blower 21, the open/closed state of the defroster/face door and foot door (vent mode), the target opening degree of the air-mix door 20, etc. and outputs control signals to various actuators so that the determined control state is obtained.

Further, again, the routine of reading the operating signals and detection signals→calculating the TAO→determining the new control state→and outputting control signals is repeated.

If the air-conditioning control device outputs a control signal to a not shown door drive device to drive rotation of the drive shaft 33a, the engagement of drive side gears 33 (pinions) and driven side gears 32 (racks) causes the door body part 30 to slide. At this time, the slide movement of the door body part 30 is guided by the guide grooves 36 (case side seal surfaces 17a, 19a and guide wall surface 35)

When the door body part 30 closes the cool air passage 19 and the door body part 30 receives air pressure, the downwind side plate surface 30a of the door body part 30 abuts against the case side seal surface 19a to give rise to a sealing ability. Similarly, when the door body part 30 closes the warm air passage 17 and the door body part 30 receives air pressure, the downwind side plate surface 30a of the door body part 30 abuts against the case side seal surface 17a to give rise to a sealing ability.

According to the present embodiment, the driven side gear 32 is arranged at a position outside from the guide grooves 36, so the teeth of the rack 32 engaging with the pinion 33 (drive side gear) or the surface of the guide wall surface 35 will never be roughened. Further, no stick slip sound will be generated by the driven side gear 32. The "stick slip" sound is the sound caused when the teeth of the driven side gear 32 (rack) catch at the guide wall surface 35, bend, deform, and vibrate.

Furthermore, projections 40 are interposed between the door body part 30 and the guide wall surface 35, so the clearance between the case side seal surface 17a or 19a and the door body part 30 can be kept from becoming greater and the sealing ability deteriorating and the width of the guide groove 36 can be secured. Since the width of the guide groove 36 can be secured, it is possible to avoid the mold for forming the guide groove 36 becoming thinner and the strength of the mold becoming insufficient.

In the present embodiment, a plurality of the projections 40 are provided and are arranged in the door movement direction X. The distance between the plurality of projections 40 is preferably larger than the distance between teeth of the driven side gear 32. Specifically, when the module value of the driven side gear 32 is "m", the distance between the plurality of projections 40 is preferably 2×m×π or more. This is so as to absorb vibration of the projections 50 at portions of the door body part 30 between the projections 40 and thereby suppress sliding noise of the projections 40.

Further, the projections 40 preferably have a higher bending rigidity in the movement direction X of the door compared with the driven side gear 32. Specifically, the projections 40 preferably have projecting shapes with a base length dimension L1 larger than the height dimension H1. The projections 40 preferably have projecting shapes with a base length dimension L1 larger than the front end length dimension L2. This is to enable bending deformation and vibration of the projections 40 to be suppressed and sliding noise of the projections 40 to be suppressed.

In the present embodiment, the projections 40 are formed with hollow relief spaces 40a, so when forming the projections 40 integrally with the door body part 30, the occurrence of so-called "sink marks" can be suppressed.

The relief spaces 40a open facing the door width direction W, so it is possible to suppress the occurrence of "sink marks" while securing the contact area between the door body part 30 and the case side seal surface 17a so as to secure sealing ability.

Second Embodiment

Figure 7:
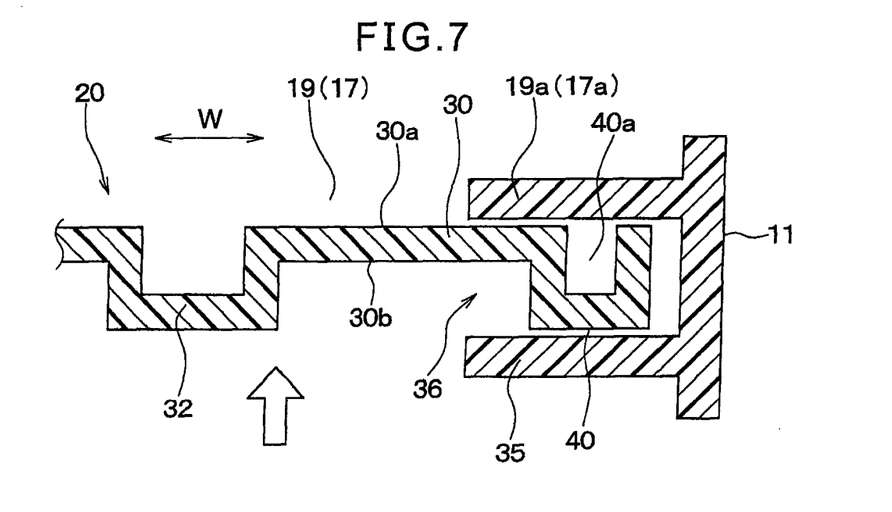
FIG. 7 is a cross-sectional view of key parts of an inside air-conditioning unit in a second embodiment.

In the above first embodiment, the relief spaces 40a of the projections 40 open toward the door width direction W, but in the second embodiment, as shown in FIG. 7, the relief spaces 40a open toward a direction parallel to the projecting direction of the projections 40.

In this embodiment, the relief spaces 40a are made to open from the front end sides of the projections 40 (bottom side in FIG. 3) to the base sides (top side in FIG. 6A). In other words, the relief spaces 40a are formed by removal of material laterally from the base side of the projections 40.

According to the present embodiment, the opening directions of the relief spaces 40a match the direction of mold removal when integrally forming the door body part 30 and the projections 40, so mold removal becomes easy.

Third Embodiment

Figure 8:
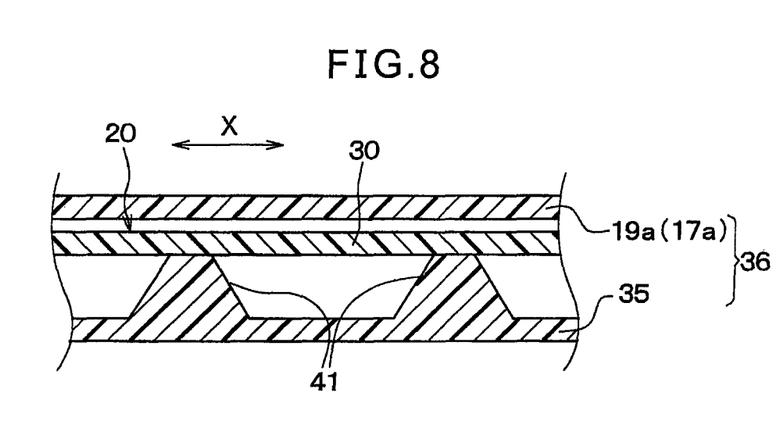
FIG. 8 is a cross-sectional view of key parts of an inside air-conditioning unit in a third embodiment.

In the above first embodiment, projections 40 are formed at the door body part 30, but in the third embodiment, as shown in FIG. 8, projection parts 41 are formed at the guide wall surface 35. Specifically, the projection parts 41 are formed so as to project out from the guide wall surface 35 toward the door body part 30. The shapes, dimensions, and arrangement of the projection parts 41 are similar to the projections 40 of the first embodiment, so explanations are omitted.

According to the present embodiment, the door body part 30 is not formed with projections 40, so the door body part 30 can easily bend and deform along the bent shapes of the case side seal surfaces 17a, 19a and guide wall surface 35 and easily closely contact the case side seal surfaces 17a, 19a. For this reason, it is possible to improve the sealing ability.

Further, according to the present embodiment, management of the clearance of the guide groove 36 is easy. That is, management of the clearance of the guide groove 36 for enabling smooth sliding of the door body part 30. In the above first embodiment, management of the clearance is necessary for the guide groove 36 as a whole. In the present embodiment, management of clearance between only the projection parts 41 and case side seal surfaces 17*a*, 19*a* is enough. As a result, tuning of the mold becomes simpler and molding can be facilitated.

Other Embodiments

Note that, in the above embodiments, the present invention was explained with reference to the example of application to a vent mode switching door of a vehicular air-conditioning system, but the invention is not limited to this. It may also be applied to an air mix door of a vehicular air-conditioning system or inside/outside air switching door.

Further, the present invention can be broadly applied to various air passage opening/closing devices such as air passage opening/closing devices in air-conditioning systems installed in houses, buildings, etc.

Further, in the above embodiments, a plurality of projections 40, 41 are provided as interposed parts which are interposed between the door body part 30 and the guide wall surface 35, but the invention is not limited to this. The number, shape, arrangement, etc. of the interposed parts may be modified in various ways.

Figure 9:
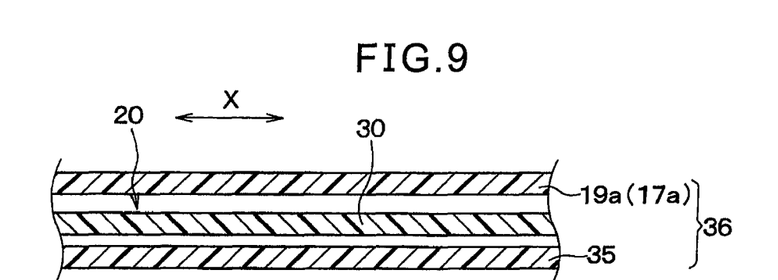
FIG. 9 is a cross-sectional view of key parts of an inside air-conditioning unit in another embodiment.

Further, it is also possible not to provide the interposed parts 40, 41 like in the above embodiments and to make the width of the guide groove 36 narrower such as shown in FIG. 9. In this case, there is the problem that the mold for forming the guide groove becomes extremely thin and weak in strength. As a measure against this, it is sufficient to make the case separate at the case side seal surfaces 17*a*, 19*a* and guide wall surface 35 and to form the case side seal surfaces 17*a*, 19*a* and the guide wall surface 35 by separate molds. In this case, no projections need be provided, so the mold structure becomes simpler. Further, relief-free smooth surfaces slide with each other, so there is less sliding noise.

While the invention has been described by reference to specific embodiments chosen for purposes of illustration, it should be apparent that numerous modifications could be made thereto by those skilled in the art without departing from the basic concept and scope of the invention.

The invention claimed is:

1. The air passage opening/closing device comprising:
a case which forms an air passage,
a slide door which has a door body part made of plastic formed in a plate-shape, which is arranged to be able to slide in the case, and which opens and closes the air passage; and
a gear mechanism which drives the slide door,
wherein the case is formed with guide grooves which are positioned at two sides of the air passage in a width direction of the door body part and each of which is comprised of a case side seal surface which the door body part abuts against and a guide wall surface which faces the case side seal surface,
two end parts of the door body part in the width direction are arranged inside of the guide grooves,
the gear mechanism has at least one driven side gear which is provided at the door body part and at least one drive-side gear which engages with the driven side gear,
the driven side gear is formed to extend in parallel with a movement direction of the slide door at a portion positioned at the inside in the width direction from the guide grooves at the door body part,
a portion of the door body part facing the guide wall surface or a portion of the guide wall surface facing the door body part is formed with interposed parts which are interposed between the door body part and the guide wall surface, and
said interposed parts have a bending rigidity in the movement direction of said slide door higher than the teeth of said driven side gear.

2. The air passage opening/closing device as set forth in claim 1, wherein said interposed parts are formed as a plurality of projections which are arranged in the movement direction of the slide door, and
a distance between the plurality of projections is larger than a distance between teeth of the driven side gear.

3. The air passage opening/closing device as set forth in claim 2, wherein when a module value of said driven side gear is "m", said plurality of projections are formed at intervals of 2×m×π or more.

4. The air passage opening/closing device as set forth in claim 1, wherein said interposed parts have projecting shapes with a base length dimension larger than a height dimension.

5. The air passage opening/closing device as set forth in claim 1, wherein said interposed parts have projecting shapes with a base length dimension larger than a front end length dimension.

6. The air passage opening/closing device as set forth in claim 5, wherein said interposed parts are formed integrally at the door body part.

7. The air passage opening/closing device as set forth in claim 1, wherein said interposed parts are formed integrally with said guide wall surface.

8. The air passage opening/closing device as set forth in claim 6, wherein said interposed parts are formed with hollow relief spaces.

9. The air passage opening/closing device as set forth in claim 8, wherein said hollow relief spaces open toward the width direction.

10. The air passage opening/closing device as set forth in claim 8, wherein said hollow relief spaces open facing a direction parallel to a projecting direction of the interposed parts.

* * * * *

UNITED STATES PATENT AND TRADEMARK OFFICE
CERTIFICATE OF CORRECTION

PATENT NO. : 9,434,234 B2
APPLICATION NO. : 13/348933
DATED : September 6, 2016
INVENTOR(S) : Yoshihiro Suzuki It is certified that error appears in the above-identified patent and that said Letters Patent is hereby corrected as shown below:

On the Title Page

At Column 1, (75) Inventor, Line number 1, delete "Kariya" and insert -- Kariya-city, Aichi-pref. --.

In the Claims

At Column 11, Claim number 1, Line number 41, delete "The" and insert -- An --.

Signed and Sealed this
Seventh Day of February, 2017

Michelle K. Lee
*Director of the United States Patent and Trademark Office*